(12) United States Patent
Senjalia

(10) Patent No.: US 6,581,064 B1
(45) Date of Patent: Jun. 17, 2003

(54) SOFTWARE TOOL FOR CREATING DATABASES

(75) Inventor: Bhargav Senjalia, Morrisville, NC (US)

(73) Assignee: Databased Design & Decisions, Inc., Cary, NC (US)

( * ) Notice: Subject to any disclaimer, the term of this patent is extended or adjusted under 35 U.S.C. 154(b) by 345 days.

(21) Appl. No.: 09/598,345

(22) Filed: Jun. 21, 2000

(51) Int. Cl.[7] .............................................. G06F 17/30
(52) U.S. Cl. ....................................... 707/100; 707/200
(58) Field of Search ................................ 707/200, 100; 341/106; 345/861

(56) References Cited

U.S. PATENT DOCUMENTS 6,032,158 A * 2/2000 Mukhopadhyay et al. .... 707/10
6,118,449 A * 9/2000 Rosen et al. ................. 345/861
6,121,903 A * 9/2000 Kalkstein .................... 341/106
6,393,434 B1 * 5/2002 Huang et al. ................ 707/200

* cited by examiner

Primary Examiner—Safet Metjahic
Assistant Examiner—Cam-Linh Nguyen
(74) Attorney, Agent, or Firm—Withrow & Terranova, PLLC

(57) ABSTRACT

The present invention is directed to software for creating a database structure. Specifically, the software creates multiple tables to represent an entity in a database. The software processes information input by the user and generates the following three types of tables to represent each entity: (1) a static table containing all the static attributes plus the identifying attribute; (2) a semi-dynamic table containing all the semi-dynamic attributes and the identifying attribute; and (3) a set of dynamic tables for every group of dynamic attributes that have the same record frequency, each of the tables containing the dynamic attributes and the identifying attribute. The software of the present invention also generates intelligent reports on the data stored in the database.

40 Claims, 17 Drawing Sheets

CUSTOMER STATIC TABLE

| PK=CUST_NUM | FIRST_ACCT_OPEN_DATE |
|---|---|
| C1 | 01-01-2000 |
| C2 | 02-02-2000 |
| C3 | 03-03-2000 |

CUSTOMER SEMI_DYNAMIC TABLE

| PK=CUST_NUM | CUST_GEO_STATE | STATE_TIME_DATE_STAMP | CUST_PHONE_NUM | PHONE_TIME_DATE_STAMP | PK=ROW_TIME_DATE_STAMP |
|---|---|---|---|---|---|
| C1 | VA | 01-15-2000 | 757-838-1000 | 05-15-2000 | 05-15-2000 |
| C2 | NC | 03-15-2000 | 919-634-9999 | 03-15-2000 | 03-15-2000 |
| C3 | CA | 03-01-2000 | 404-218-5000 | 03-01-2000 | 03-01-2000 |

CUSTOMER DYNAMIC TABLES; RF=12

| PK=CUST_NUM | MONTHLY_IN_HOUSE_RATING (1) | MONTHLY_BUREAU_RATING (1) |
|---|---|---|
| C1 | 90 | 98 |
| C2 | 76 | 73 |
| C3 | 82 | 83 |

CUSTOMER DYNAMIC TABLES; RF=4

| PK=CUST_NUM | QUARTERLY_BUREAU_RATING (1) |
|---|---|
| C1 | 92 |
| C2 | 74 |
| C3 | 79 |

FIGURE 2

ENTITY: CUSTOMER

| ATTRIBUTE | CATEGORY | FREQUENCY |
|---|---|---|
| CUST_NUM | IDENTIFYING | N/A |
| FIRST_ACCT_OPEN_DATE | STATIC | N/A |
| CUST_GEO_STATE | SEMI-DYNAMIC | N/A |
| CUST_PHONE_NUM | SEMI-DYNAMIC | N/A |
| MONTHLY_IN_HOUSE_RATING | DYNAMIC | 12 |
| MONTHLY_BUREAU_RATING | DYNAMIC | 12 |
| QUARTERLY_BUREAU_RATING | DYNAMIC | 4 |

FIGURE 3A

CUSTOMER STATIC TABLE

| CUST_NUM | FIRST_ACCT_OPEN_DATE |
|---|---|
| C1 | 01-01-2000 |
| C2 | 02-01-2000 |
| C3 | 03-01-2000 |

CUSTOMER SEMI_DYNAMIC TABLE

| CUST_NUM | CUST_GEO_STATE | STATE_TIME_DATE_STAMP | CUST_PHONE_NUM | PHONE_TIME_DATE_STAMP | ROW_TIME_DATE_STAMP |
|---|---|---|---|---|---|
| C1 | VA | 01-15-2000 | 757-838-1000 | 05-15-2000 | 05-15-2000 |
| C1 | NY | 01-01-2000 | 214-838-1000 | 01-01-2000 | 01-01-2000 |
| C2 | NC | 03-15-2000 | 919-634-9999 | 03-15-2000 | 03-15-2000 |
| C2 | MD | 02-28-2000 | 301-634-9999 | 02-28-2000 | 02-28-2000 |
| C2 | SC | 02-01-2000 | 813-324-5000 | 02-01-2000 | 02-01-2000 |

CUSTOMER SEMI-DYNAMIC HISTORY TABLE

| CUST_NUM | CUST_GEO_STATE | STATE_TIME_DATE_STAMP | CUST_PHONE_NUM | PHONE_TIME_DATE_STAMP | ROW_TIME_DATE_STAMP |
|---|---|---|---|---|---|
| C3 | FL | 03-25-2000 | 252-825-5351 | 03-25-2000 | 03-25-2000 |
| C3 | GA | 03-01-2000 | 404-218-5000 | 03-01-2000 | 03-01-2000 |

FIGURE 3B

CUSTOMER DYNAMIC TABLES; RF=12

| CUST_NUM | MONTHLY_IN_HOUSE_RATING (1) | MONTHLY_BUREAU_RATING (1) |
|---|---|---|
| C1 | 90 | 98 |
| C2 | 76 | 73 |
| C3 | 82 | 83 |

CUSTOMER DYNAMIC TABLES; RF=4

| CUST_NUM | QUARTERLY_BUREAU_RATING (1) |
|---|---|
| C1 | 92 |
| C2 | 74 |
| C3 | 79 |

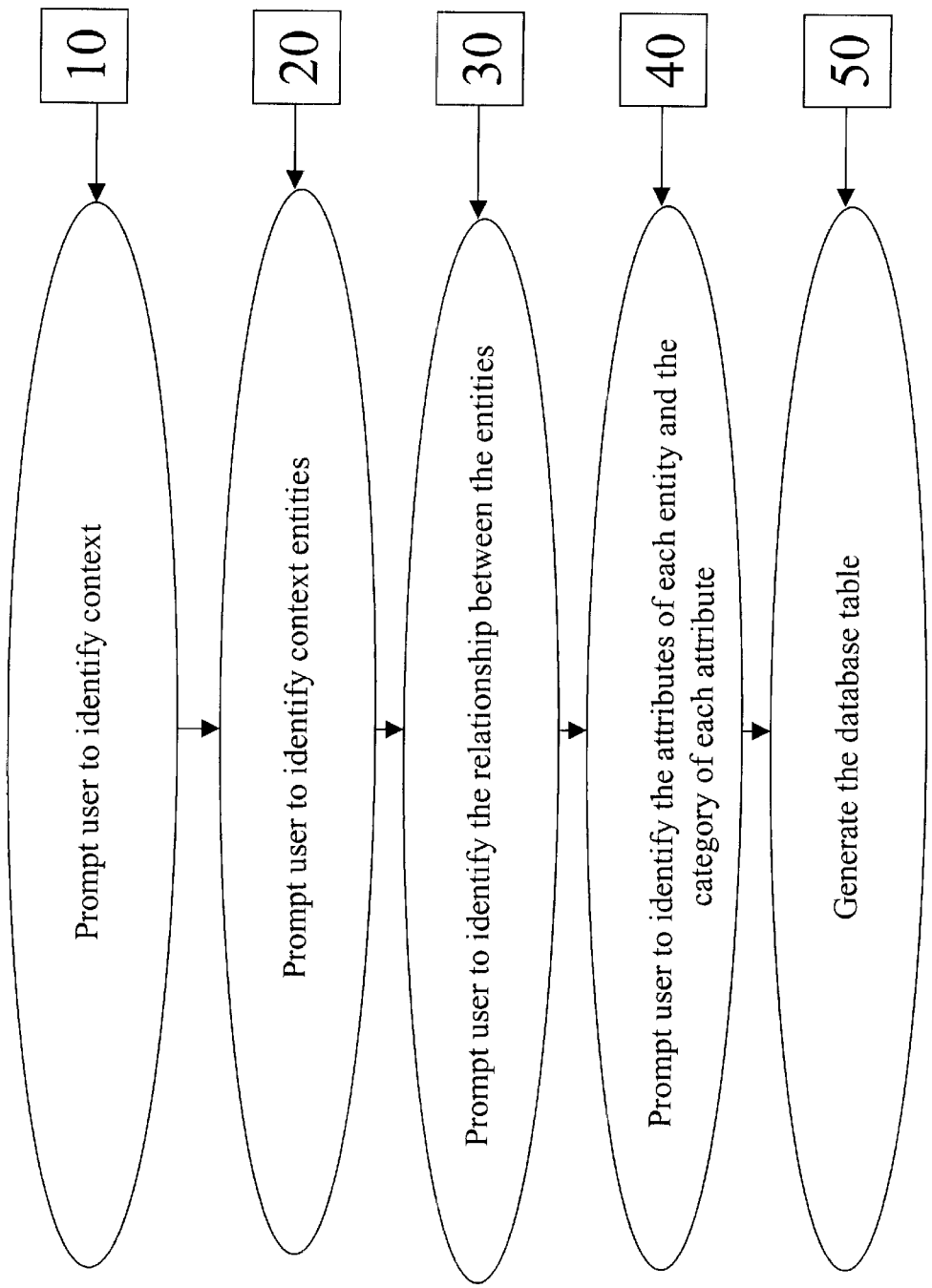

FIGURE 5

ENTITY: ACCOUNT

| ATTRIBUTE | CATEGORY | FREQUENCY |
|---|---|---|
| ACCT_NUM | IDENTIFYING | N/A |
| ACCT_OPEN_DATE | STATIC | N/A |
| SIZE | SEMI-DYNAMIC | N/A |
| THIS_MONTH_PAYMENT | DYNAMIC | 12 |

Figure 6A

CUSTOMER STATIC TABLE

| PK=CUST_NUM | FIRST_ACCT_OPEN_DATE |
|---|---|
| C1 | 01-01-2000 |
| C2 | 02-02-2000 |
| C3 | 03-03-2000 |

CUSTOMER SEMI_DYNAMIC TABLE

| PK=CUST_NUM | CUST_GEO_STATE | STATE_TIME_DATE_STAMP | CUST_PHONE_NUM | PHONE_TIME_DATE_STAMP | PK=ROW_TIME_DATE_STAMP |
|---|---|---|---|---|---|
| C1 | VA | 01-15-2000 | 757-838-1000 | 05-15-2000 | 05-15-2000 |
| C2 | NC | 03-15-2000 | 919-634-9999 | 03-15-2000 | 03-15-2000 |
| C3 | CA | 03-01-2000 | 404-218-5000 | 03-01-2000 | 03-01-2000 |

CUSTOMER DYNAMIC TABLES; RF=12

| PK=CUST_NUM | MONTHLY_IN_HOUSE_RATING (1) | MONTHLY_BUREAU_RATING (1) |
|---|---|---|
| C1 | 90 | 98 |
| C2 | 76 | 73 |
| C3 | 82 | 83 |

CUSTOMER DYNAMIC TABLES; RF=4

| PK=CUST_NUM | QUARTERLY_BUREAU_RATING (1) |
|---|---|
| C1 | 92 |
| C2 | 74 |
| C3 | 79 |

Figure 6B

ACCOUNT STATIC TABLE

| PK=ACCT_NUM | FK=CUST_NUM | ACCT_OPEN_DATE |
|---|---|---|
| A1 | C1 | 01-01-2000 |
| A2 | C1 | 01-15-2000 |
| A3 | C1 | 01-30-2000 |

ACCOUNT SEMI_DYNAMIC TABLE

| PK=ACCT_NUM | SIZE_SML | SIZE_TIME_DATE_STAMP | PK=ROW_TIME_DATE_STAMP |
|---|---|---|---|
| A1 | Small | 01-15-2000 | 01-15-2000 |
| A1 | Large | 01-03-2000 | 01-03-2000 |
| A2 | Medium | 02-15-2000 | 02-15-2000 |
| A3 | Large | 03-15-2000 | 03-15-2000 |

ACCOUNT DYNAMIC TABLES; RF=12

| PK=ACCT_NUM | THIS_MONTH_PAYMENT (1) |
|---|---|
| A1 | $100 |
| A2 | $200 |
| A3 | $300 |

FIGURE 7A

LEASING COMPANY A
CUSTOMER STATIC TABLE

| CUST_NUM | ORIG_RATING | FIRST_ACCT_OPEN_DATE |
|---|---|---|
| 1-1 | A | 01-03-2000 |
| 1-2 | B | 02-03-2000 |
| 1-3 | C | 03-03-2000 |

LEASING COMPANY B
CUSTOMER STATIC TABLE

| CUST_NUM | ORIG_RATING | ORIG_RATING_DATE |
|---|---|---|
| 2-1 | A | 12-12-2000 |
| 2-2 | B | |
| 2-3 | C | 11-13-2000 |
| 2-4 | D | |
| 2-5 | E | 10-15-2000 |

FIGURE 7B

MERGED CUSTOMER STATIC
TABLE OF COMPANY A AND
COMPANY B

| CUST_NUM | ORIG_RATING | FIRST_ACCT_OPEN_DATE | ORIG_RATING_DATE |
|---|---|---|---|
| 1-1 | A | 01-03-2000 | |
| 1-2 | B | 01-03-2000 | |
| 1-3 | C | 03-03-2000 | |
| 2-1 | A | | 12-12-2000 |
| 2-2 | B | | |
| 2-3 | C | | 11-13-2000 |
| 2-4 | D | | |
| 2-5 | E | | 10-15-2000 |

FIGURE 8

ENTITY: ACCOUNT

| ATTRIBUTE | CATEGORY | FREQUENCY |
|---|---|---|
| ACCT_NUM | IDENTIFYING | N/A |
| ACCT_OPEN_DAY | STATIC | N/A |
| ACCT_TYPE | SEMI_DYNAMIC | N/A |
| ACCT_MO_PAYMENT | DYNAMIC | 12 |
| ACCT_MO_RATING | DYNAMIC | 12 |

FIGURE 9A

ACCOUNT STATIC TABLE

| ACCT_NUM | ACCT_OPEN_DAY |
|---|---|
| A1 | MONDAY |
| A2 | TUESDAY |
| A3 | MONDAY |
| A4 | WEDNESDAY |
| A5 | WEDNESDAY |

ACCOUNT SEMI-DYNAMIC TABLE

| ACCT_NUM | ACCT_TYPE | TYPE_TIME_DATE_STAMP | ROW_TIME_DATE_STAMP |
|---|---|---|---|
| A1 | SMALL | 01-01-2000 | 01-01-2000 |
| A2 | MEDIUM | 03-01-2000 | 03-01-2000 |
| A3 | LARGE | 12-01-1999 | 12-01-1999 |
| A4 | LARGE | 12-01-1999 | 12-01-1999 |
| A5 | MEDIUM | 01-01-2000 | 01-01-2000 |

ACCOUNT SEMI-DYNAMIC HISTORY TABLE

| ACCT_NUM | ACCT_TYPE | TYPE_TIME_DATE_STAMP | ROW_TIME_DATE_STAMP |
|---|---|---|---|
| A2 | SMALL | 01-01-2000 | 01-01-2000 |
| A2 | LARGE | 12-01-1999 | 12-01-1999 |
| A2 | SMALL | 09-01-1999 | 09-01-1999 |
| A4 | MEDIUM | 10-01-1999 | 10-01-1999 |
| A3 | SMALL | 10-01-1999 | 10-01-1999 |
| A5 | SMALL | 11-01-1999 | 11-01-1999 |

FIGURE 9B

ACCOUNT DYNAMIC TABLES; RF=12

| ACCT_NUM | ACCT_MO_PAYMENT (1) | ACCT_MO_RATING (1) |
|---|---|---|
| A1 | 100 | GOOD |
| A2 | 100 | BAD |
| A3 | -50 | OK |
| A4 | 200 | BAD |
| A5 | 300 | OK |

| ACCT_NUM | ACCT_MO_PAYMENT (2) | ACCT_MO_RATING (2) |
|---|---|---|
| A1 | 150 | GOOD |
| A2 | 100 | OK |
| A3 | 200 | OK |
| A4 | 250 | BAD |
| A5 | 100 | BAD |

| ACCT_NUM | ACCT_MO_PAYMENT (3) | ACCT_MO_RATING (3) |
|---|---|---|
| | | |

FIGURE 10

| Distinct Values | Count |
|---|---|
| MON | 2 |
| TUES | 1 |
| WED | 2 |

FIGURE 11A

| ACCT. TYPE | COUNT |
|---|---|
| SMALL | 1 |
| MED | 2 |
| LARGE | 2 |

FIGURE 11B

| ACCT. TYPE | COUNT |
|---|---|
| SMALL | 3 |
| MED | 1 |
| LARGE | 1 |

FIGURE 11C

| ACCT. TYPE | # of Identifying Attributes | | Frequency |
|---|---|---|---|
| SMALL | 2 | 1 | 1 |
| | 1 | | 2 |
| MED | 1 | 1 | |
| | 1 | | 1 |
| LARGE | 1 | | |
| | 1 | | 1 |

FIGURE 12

| ACCT_MO_PAY | | Dynamic Table-1 | Dynamic Table-2 |
|---|---|---|---|
| | Positive Sum | 700 | 800 |
| | # of Rows | 4 | 5 |
| | Negative Sum | -50 | 0 |
| | # of Rows | 1 | 0 |
| | Zero Value | 0 | 0 |
| | # of Rows | 0 | 0 |

FIGURE 13

|  | Dynamic Table-1 | Dynamic Table-2 |
|---|---|---|
| OK | 2 | 2 |
| BAD | 2 | 2 |
| GOOD | 1 | 1 |

SOFTWARE TOOL FOR CREATING DATABASES

BACKGROUND OF THE INVENTION

The present invention relates generally to computer databases, and more particularly, to software that automatically creates a database structure.

Computers are essential to the daily operations of both commercial and non-commercial organizations. In particular, computers are often used to store and process data. In order for a computer to store and process data, the data must be organized in a computer-readable format. Any type of infrastructure and logical organization for storing data is generally called a database. Some examples of databases include spreadsheets, relational databases, and text files.

A database may be used to store data about a context such as a business, educational institution, or government agency. Each context comprises a number of logically related entities that define the context. For example, a leasing company may be a context called LEASING_CO that comprises several related entities, such as customer and account. The relationship between these two entities may be such that each customer can have more than one account. Entities may be expressed in terms of attributes that represent components of the entity. Using the example above, the customer entity may be represented by attributes such as customer birth date (CUST_BIRTH_DATE), customer geographic state (CUST_GEO_STATE), customer number (CUST_NUM), etc.

Known application software tools that allow users to create databases require the user to specify all the tables that are to be created for the database. Specifically, the user inputs the names of the tables and the attributes of those tables. The attributes may be entered as a combination of name, type, length, and sometimes a default value. The software tool then processes the input information and outputs a database structure. According to this method, two separate organizations may have completely different database structures for storing the same type of information. For example, Leasing Company A may decide to represent an account entity in one table that includes all of the entity's attributes such as the account number (ACCOUNT_NO), the date the account was opened (ACCOUNT_OPEN_DATE), the account type (ACCOUNT_TYPE), the account owner (ACCOUNT_OWNER), and the current month's payment (PAYMENT_THIS_MONTH). On the other hand, Leasing Company B may decide to distribute the attributes of the account entity into two tables. The first table may include the account number (ACCOUNT_NO), the account type (ACCOUNT_TYPE), and the account owner (ACCOUNT_OWNER) and the second table may include the account number (ACCOUNT_NUMBER), the date the account was opened (ACCOUNT_OPEN_DATE), and payment this month (PAYMENT_THIS_MONTH).

Recently, it has become increasingly important to transfer, exchange, and merge information in databases from a number of different sources. The lack of a common database structure among organizations, such as the two leasing companies described above, makes such information exchange difficult and complex. Further, known database design systems are so complex that only experienced software professionals are capable of understanding them. As a result, the valuable usage of databases largely depends on the personnel maintaining the database system.

Accordingly, there is a need to have a common database design that allows different organizations to easily exchange and merge their databases. Further, there is a need for a database design that is easy to understand and maintain.

SUMMARY OF THE INVENTION

The present invention fulfills the need discussed above by providing software that does not require the user to specify the tables created to represent an entity. Rather, the software of the present invention automatically creates three types of tables to represent an entity in a database. The user need only specify the entity represented, the attributes defining that entity, and the category of each attribute. Each attribute is categorized into one of the following categories: (1) identifying; (2) static; (3) semi-dynamic; and (4) dynamic. A static attribute is one whose value remains constant throughout the life span of the instance of the entity. A semi-dynamic attribute is an attribute whose value may change over the life span of the entity but is not recorded on a periodic basis. A dynamic attribute is one whose value is recorded and stored at fixed time intervals for a period of time during the life span of the entity. The number of times the value is recorded within this period of time is called the record frequency.

The software processes the information input by the user and generates the following three types of tables to represent each entity: (1) a static table containing all the static attributes plus the identifying attribute; (2) a semi-dynamic table containing all the semi-dynamic attributes and the identifying attribute; and (3) a set of dynamic tables for every group of dynamic attributes that have the same record frequency, each of the tables containing the dynamic attributes and the identifying attribute.

In a preferred embodiment, the tables of the database structure store information regarding multiple entities and express a relationship between the entities. Specifically, an identifying attribute in a set of tables representing a first entity may be designated as a primary key for that particular entity. In order to express a relationship with a second entity, the primary key of the first entity may be designated as a foreign key in the second entity. The foreign key is preferably stored in the static table of the second entity.

In a second embodiment, the software of the present invention generates reports on the data stored in the database without the user having to write a complicated query. Rather, the user simply selects an attribute and the software generates a report including meaningful information on the values stored in the database for the selected attribute.

BRIEF DESCRIPTION OF THE DRAWINGS

The present invention is better understood by reading the Detailed Description of the Preferred Embodiments along with a review of the drawings, in which:

FIG. 2 is a table of information input by a user about an entity to create a database structure according to an embodiment of the present invention.

FIGS. 3A and 3B are tables generated in response to the input user information in the table of FIG. 2.

FIG. 4 is a flowchart illustrating the steps for creating a database structure according to an embodiment of the present invention.

FIG. 5 is a table of information input by a user about an entity to create a database structure according an embodiment of the present invention.

FIGS. 6A and 6B are tables generated by the method illustrated in the flowchart of FIG. 4.

FIG. 7A illustrates static tables for two organizations that may be generated in accordance with the present invention.

FIG. 7B illustrates a merged static table formed from the static tables of FIG. 7A.

FIG. 8 is a table of information input by a user about an entity to create a database structure according to the present invention.

FIGS. 9A and 9B are tables generated in response to the input user information in the table of FIG. 8.

FIG. 10 is a report table generated for a static attribute according to an embodiment of the present invention.

FIG. 11A is a report table generated for a semi-dynamic attribute according to an embodiment of the present invention.

FIGS. 11B and 11C are report tables generated for a semi-dynamic attribute in a semi-dynamic history table according to an embodiment of the present invention.

FIG. 12 is a report table generated for a dynamic attribute having numeric values.

FIG. 13 is a report table generated for a dynamic attribute having non-numeric values.

DETAILED DESCRIPTION OF THE PREFERRED EMBODIMENT

Figure 1:
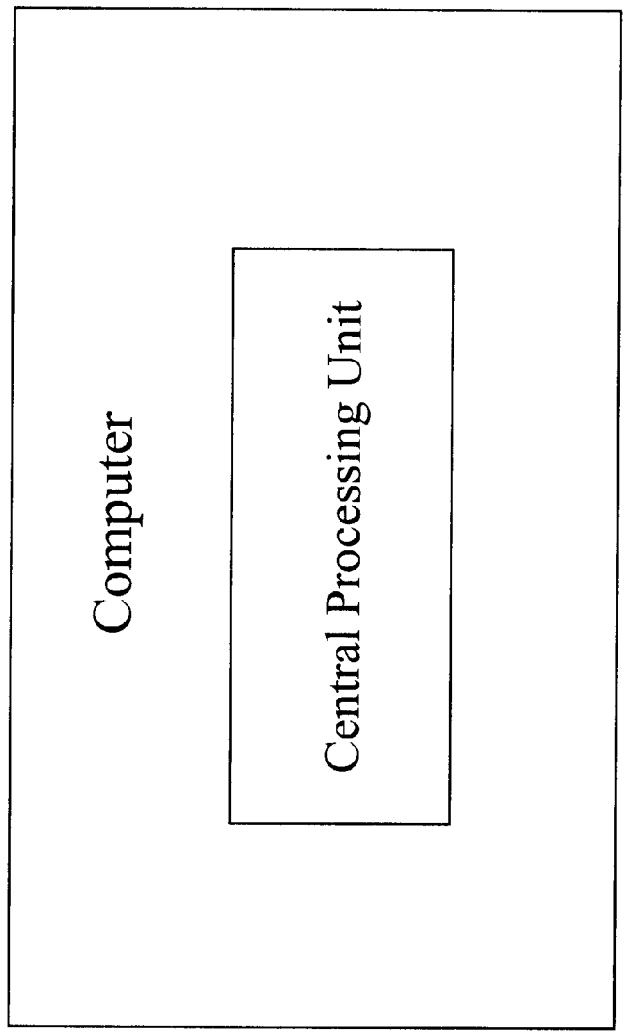
FIG. 1 is a computer on which the software of the present invention may be loaded.

The illustrations and examples discussed in the following description are provided for the purpose of describing the preferred embodiments of the invention and are not intended to limit the invention thereto.

The software of the present invention enables creation of a common database structure by instructing a computer to automatically generate multiple tables to store information about an entity. The software may be loaded onto a conventional computer having a central processing unit, such as the one shown in FIG. 1. In order to create the database structure using the software, the user only has to identify the context, the entities of the context, the attributes of the entities, and the category of each of the attribute. Each attribute can be categorized into one of the following four categories: (1) identifying; (2) static; (3) semi-dynamic; and (4) dynamic. This categorization is referred to herein as I-S-SD-D database design methodology.

An identifying attribute is one whose value uniquely identifies an entity. For example, in the context of a leasing company (LEASING_CO), customer number (CUST_NUM) may be an identifying attribute of the customer (CUSTOMER) entity. A static attribute is one whose value remains constant throughout the life span of the instance of the entity. Using the leasing company context above, the date the first account is opened (FIRST_ACCT_OPEN_DATE) will remain the same over time, and thus will be a static attribute of the customer entity.

A semi-dynamic attribute is an attribute whose value may change over the life span of the entity but is not recorded on a periodic basis. Again, using the leasing company context example, the customer's geographic state (CUST_GEO_STATE) may be a semi-dynamic attribute of the customer entity, because a customer may move from state to state on a non-periodic basis. Whenever a change in the value of a semi-dynamic attribute is recorded, the time and date when the change is recorded may be stored along with the change itself. For example, if a customer moves from North Carolina to Virginia, the date and time when the change is recorded may be stored in the database. Similarly, a customer may change his or her phone number. Therefore, the customer's phone number (CUST_PHONE_NUM) may also be a semi-dynamic attribute.

A dynamic attribute is one whose value is recorded and stored at fixed intervals for a period of time during the life span of the entity. In the leasing company context, some dynamic attributes may be monthly in-house rating (MONTHLY_IN-HOUSE_RATING) and monthly bureau rating (MONTHLY_BUREAU_RATING) for the customer entity. In this example, the dynamic attributes are recorded once a month during each one-year period. Therefore, these dynamic attributes have a record frequency of 12. Another dynamic attribute of the customer entity may be quarterly bureau rating (QUARTERLY_BUREAU_RATING). This dynamic attribute is recorded only four times a year so it has a record frequency of 4.

In order to create a database structure using the I-S-SD-D attribute categorization described above, the software of the present invention prompts the user to enter the information, as illustrated in the table of FIG. 2. As shown in the table, the user identifies the name of the entity, the name of each attribute, the category of each attribute, and the record frequency of the attribute where applicable.

The software then processes the information input by the user and generates the following three types of tables to represent each entity, as shown in FIGS. 3A and 3B: (1) a static table containing all the static attributes plus the identifying attribute; (2) a semi-dynamic table containing all the semi-dynamic attributes and the identifying attribute; and (3) a set of dynamic tables for every group of dynamic attributes that have the same record frequency, each of the tables containing the dynamic attribute and the identifying attribute. Each of the three types of tables representing an entity are linked to one another by the identifying attribute of that particular entity.

The customer static table shown in FIG. 3A depicts how the values of the attributes may be entered into the table by the database user. Specifically, the customer static table shows three instances of the customer entity because three different customers (C1, C2, C3) have accounts. Each of the semi-dynamic attributes in this table has an associated time and date stamp (TIME_DATE_STAMP) attribute. This attribute records the time and date when a change in the value of a corresponding semi-dynamic attribute is recorded. There is also a row time and date stamp (ROW_TIME_DATE_STAMP) attribute that records the time and date when the most recent change in value of a semi-dynamic attribute is recorded in a particular row of the table. The software automatically creates the time and date stamps according to the time and date kept by the computer's operating system. While an instance of an entity is active, a history of the changes in value of the semi-dynamic attribute, and the corresponding changes in value of the time and date stamp attribute, are stored in the semi-dynamic table. Preferably, once an instance of an entity is closed, the history of all of the changes is moved to a semi-dynamic history table. For example, the semi-dynamic table of FIG. 3A includes a history of values for customer numbers C1 and C2 because these accounts are open. The account for customer number C3 is closed, so the history of changes in value has been moved to the semi-dynamic history table.

As shown in FIG. 3B, a set of twelve tables is generated for the monthly in-house rating and monthly bureau rating attributes because they both have a record frequency of 12. Other dynamic attributes having a record frequency of 12 may also be included in the set of tables containing the monthly in-house rating and monthly bureau rating attributes. The quarterly bureau rating attribute has a record frequency of 4, so a set of four tables is generated for that particular attribute. Any other attributes having a record frequency of 4 may be included in this set of tables. Each time a value of a dynamic attribute is recorded, the value is stored in a separate table within the set of tables for that record frequency. Thus, each table in a set of dynamic tables includes a value for one particular time period. For example, each month when the monthly in-house rating attribute is recorded, the new value is stored in the dynamic table for that particular month.

The process of creating a database based on I-S-SD-D is outlined in FIG. 4. First, the software prompts the user to identify the context for the database, such as leasing company (step 10). The software then prompts the user to identify the entities of the context such as customer and account (step 20). The user is then prompted to identify the relationships between the entities if more than one entity exists (step 30). In the present example, the user may specify that one customer has more than one account, but each account may be associated with only one user. The relationship between the entities may be expressed in the database tables, as discussed below.

After the user identifies each entity, the software prompts the user to identify the attributes of each entity and the category in which each attribute belongs (step 40). If the attribute's category is dynamic, the user is prompted to identify the record frequency of the attribute. For example, the customer attributes may include those attributes shown in FIG. 2. For example, as shown in FIG. 5, the attributes may include: account number (ACCT_NUM); account open date (ACCT_OPEN_DATE); account size (SIZE); and payment this month (THIS_MONTH_PAYMENT).

The user is prompted to enter the information in each of the above-described steps through a graphical user interface. The interface may be designed to ask the user a series of logical questions that require a "YES" or "NO" answer. The interface may also be designed to provide the user with a default list of entities with their common attributes. In addition, the user may be given a choice of either using the available entities or creating his or her own list of entities and corresponding attributes.

Referring again to the flowchart of FIG. 4, the software processes the information input by the user and generates a database structure (step 50), which consists of I-S-SD-D tables, as shown in FIGS. 6A and 6B. The graphical user interface may allow the user to view and print the tables.

As mentioned above, the relationship between the entities, specified by the user, may be expressed in the database tables. This is achieved by defining a primary-key ("PK") and a foreign-key ("FK"). As shown in FIGS. 6A and 6B, the identifying attribute for the customer entity, CUST_NUM, is a primary-key ("PK") in each of the three types of tables for that particular entity. Likewise, the identifying attribute for the account entity, ACCT_NUM, is the primary key for that particular entity. The primary key is typically the identifying attribute in a set of tables representing a particular entity. In addition, the primary key may be the row time and date stamp attribute in the semi-dynamic table for a particular entity, as shown in FIGS. 6A and 6B. The row time and date stamp attribute gives each row in the semi-dynamic table a unique primary key. For example, there are two instances of the primary key, A1, in FIG. 6B. By designating the row time and date stamp as an additional primary key, each row in the semi-dynamic table has a unique combination of primary keys. Specifically, the combination of primary keys for the first instance of A1 is "A1-01-15-2000" and the combination of primary keys for the second instance is "A1-02-15-2000". The foreign key is used to express a relationship between two or more entities. In the leasing company example, the user specified that the relationship between the customer and account entities is that each customer may have more than one account, but each account can only be associated with one user. In order to show this relationship, CUST_NUM is expressed as a foreign key in the account entity tables. Preferably, the foreign key attribute is included only in the static table of the present entity. Thus, the static table of the account entity includes CUST_NUM as foreign-key, as shown in FIG. 6B.

The designation of a primary key and a foreign key is particularly applicable where there are multiple instances of an entity represented in a table. For example, three instances of the account entity (A1, A2, and A3) are depicted in the static table of FIG. 6B. The designation of the foreign key indicates that each of the accounts belongs to a single customer, C1.

According to the above-described database design and method of creating a database, an entity in any context is represented by only three types of database tables: static, semi-dynamic, and dynamic. This common database structure allows for direct table-to-table exchange and merging of data between organizations. As a result, less time is needed in database integration, as discussed below.

Assume, for example, that two companies decide to merge. According to known methods of creating databases, each of the companies will have its own database design that is specifically tailored to the needs of that company. Specifically, each of the companies will have any number of tables representing its entities. In addition, only the employees who maintain the database will have full knowledge of how the database is designed. The database manager of one of the companies will not likely understand the database design of the other company, and vice versa. If, however, both companies use the I-S-SD-D database design methodology, the databases may be easily combined and the database manager of either company will immediately recognize the schema.

The direct table-to-table exchange that is enabled by the present invention is easiest to understand when two companies that use the I-S-SD-D methodology have at least one common entity and plan to merge. For example, assume that Leasing Company A and Leasing Company B plan to merge. As shown in FIG. 7A, Leasing Company A uses the I-S-SD-D methodology to create a static table for an entity called customer. The attributes of the customer entity are: customer number (CUST_NUM); original rating (ORIG_RATING); and first account open date (FIRST_ACCT_OPEN_DATE). Leasing Company B also uses the I-S-SD-D methodology to create a static table for an entity called customer. The attributes of this customer entity are customer number (CUST_NUM); original rating (ORIG_RATING); and original rating date (ORIG_RATING_DATE). When the databases of the two companies are merged, the database manager can simply combine the static tables of both companies for the customer entity. Specifically, the rows of the two static tables are combined and the common attribute columns are combined. A new column is created for any attribute that is unique to only one of the companies. The resulting merge for this example is shown in FIG. 7B.

The above-described software for creating a database using I-S-SD-D methodology is further configured to generate reports on the data stored in the database. The reporting system is based on the I-S-SD-D structure, so any person familiar with the methodology can generate reports without having to write a complicated query. Rather, the user only has to select one or more attributes among one or more entities. The software automatically generates reports for each of the selected attributes in table format, as discussed below.

Assume for the following discussion that a leasing company has an existing I-S-SD-D database consisting of an account entity having five attributes. The attributes of the account entity are: account number (ACCT_NUM); account open date (ACCT_OPEN_DAY); account type (ACCT_TYPE); account monthly payment (ACCT_MO_PAYMENT); and account monthly rating (ACCT_MO_RATING). The attributes and their respective categories are shown in the table of FIG. 8. In accordance with the embodiment discussed above, the software generates a static table, a semi-dynamic table, and a set of dynamic tables, as shown in FIGS. 9A and 9B. Each of the tables includes sample values for the purpose of illustrating how the software generates meaningful reports.

If a user chooses to run a report on an identifying attribute, such as account number, the software counts the number of rows in the static table including that attribute. The software then outputs the number that represents the number of instances of the identifying attribute. Accordingly, a report on the identifying attribute in the customer static table of FIG. 9A consists of the number "5" because there are five instances (rows) of the identifying attribute, account number.

If the user requests the software to generate a report on a static attribute, such as account open day, the software counts the number of rows in the static table including that attribute, and lists the distinct values. The software then outputs a report table having two columns, as shown in FIG. 10. The first column of the static report table lists all the distinct values of the static attribute in the corresponding static table. In the present example, the distinct values of the static attribute in the static table are Monday, Tuesday, and Wednesday, as shown in FIG. 9A. Thus, these values are listed in the first column of the static report table of FIG. 10. The second column of the static report table lists the number of rows in the static table containing the corresponding distinct value of the static attribute. In the present example, the static table of FIG. 9A indicates that two accounts were opened on a Monday. Therefore, the second column of the static report table of FIG. 10 shows the number "2" beside Monday. The methodology is also applied to the Tuesday and Wednesday values of the static attribute.

If the user requests the software to generate a report on a semi-dynamic attribute, such as account type, the software generates a table similar to the report table of a static attribute. Specifically, the software generates a semi-dynamic report table having two columns, as shown in FIG. 11A. The first column of the semi-dynamic report table lists all the distinct values of the semi-dynamic attribute in the corresponding semi-dynamic table. In the present example, the distinct values of the semi-dynamic attribute are small, medium, and large. These values are listed in the first column of the semi-dynamic report table. The second column of the semi-dynamic report table lists the number of rows in the semi-dynamic table containing the corresponding distinct value of the semi-dynamic attribute. In the present example, the semi-dynamic table of FIG. 9A indicates that there is only one small account. Therefore, the second column of the semi-dynamic report table of FIG. 11A shows the number "1" beside small. This methodology is also applied to the medium and large values of the semi-dynamic attribute.

If there is a history table associated with the semi-dynamic table, as shown in FIG. 9A, the software generates two semi-dynamic history report tables for the semi-dynamic attribute, as shown in FIGS. 11B and 11C. The first column of the first table (FIG. 11B) lists all the distinct values of the semi-dynamic attribute in the semi-dynamic history table. The second column lists the number of rows in the semi-dynamic history table containing the corresponding distinct value of the semi-dynamic attribute. If, however, more than one row in the semi-dynamic history table has the same value for the identifying attribute, the software counts the value of the semi-dynamic attribute only one time for that distinct identifying attribute. For example, in the semi-dynamic history table shown in FIG. 9A, there are three instances of the value A2 for the identifying attribute, account number. Two of the three instances of A2 have account types that are small. Therefore, the software counts the small account type only one time for the identifying attribute A2. The identifying attributes A3 and A5 also have small account types, so the second column of the first semi-dynamic history report table shows the number "3" for the total number of small accounts.

The first column of the second semi-dynamic history report table (FIG. 11C) also lists the distinct values of the semi-dynamic attribute in the semi-dynamic history table. The second column lists a pair of numbers. The first is the frequency of the corresponding semi-dynamic attribute within one distinct value of the identifying attribute in the semi-dynamic history table. The second is the number of distinct values of the identifying attribute that include the corresponding frequency of the semi-dynamic attribute. In the present example, the value of the semi-dynamic attribute, small, is listed four times in the semi-dynamic history table of FIG. 9A. There are two instances for the identifying attribute, A2, one instance each for the identifying attributes A3 and A5. Therefore, the second column of the second semi-dynamic history report table is broken into two sub-columns to describe the small account type. The first sub-column includes a frequency number of "2" and matching number of "1", indicating that there is one distinct value of the identifying attribute (A2) having two instances of a small account type. The second sub-column includes a frequency number of "1" and a matching number of "2", indicating that there are two distinct values of the identifying attribute (A3 and A5) having only one instance of a small account type. There is only one instance each of the medium and large account types in the semi-dynamic history table of FIG. 9A, so there is only one sub-column for each of these values, as shown in FIG. 11C.

If the user requests the software to generate a report on one or more dynamic attributes, such as account monthly payment and account monthly rating, the software generates one or more sets of dynamic report tables. If the value of the dynamic attribute is numeric, such as the number associated with account monthly payment, the software generates a numeric dynamic report table such as the one shown in FIG. 12. Specifically, the numeric dynamic attribute may be represented by a plurality of pairs of rows. For this example, there are three pairs of rows, six rows total. The first row represents the sum of all the positive values of the dynamic attribute in the dynamic table. The second row includes a total number of rows in the dynamic table containing a positive value. The third row represents the sum of the negative values of the dynamic attribute in the dynamic table. The fourth row includes a total number of rows in the dynamic table containing a negative value. The fifth row always includes a value of "0," representing the sum of the (0) values of the dynamic attribute in the dynamic table. The sixth row includes a total number of rows in the dynamic table containing a "0" value. Each column of the dynamic report table represents a dynamic table within the set of dynamic tables, in other words, a distinct time interval. Therefore, the first column represents the first dynamic table for that dynamic attribute. The second column of the dynamic report table represents the second dynamic table for that dynamic attribute, and so on.

In the present example, the first dynamic table for the dynamic attribute account monthly payment includes four rows with a sum of "700". Therefore, the first pair of rows in the numeric dynamic report table includes the numbers "700" and "4" for the first dynamic report column. Similarly, the first dynamic table for the dynamic attribute includes one row with a sum of "–50." Therefore, the second pair of rows in the numeric dynamic report table includes the numbers "–50" and "1" for the first dynamic report column. The first dynamic table for the dynamic attribute does not include any (0) values so the third pair of rows in the numeric dynamic report table includes two "0" values. This methodology is applied to each additional dynamic table in the set of tables for the account monthly payment attribute and a new column is generated in the numeric dynamic report table for each additional table.

If the dynamic attribute in the dynamic table is non-numeric, such as account monthly rating, the software generates a non-numeric dynamic report table such as the one shown in FIG. 13. Specifically, each distinct value of the non-numeric dynamic attribute is represented by a row. In the present example, the only three values of the account monthly rating are good, OK, and bad, as shown in the dynamic table of FIG. 9B. These values are represented by rows in the non-numeric dynamic report table of FIG. 13. Similar to the numeric, dynamic report table, each column of the non-numeric dynamic report table represents a dynamic table within the set of dynamic tables, in other words, a distinct time interval. Therefore, the first column represents the first dynamic table for that dynamic attribute. The second column of the dynamic report table represents the second dynamic table for that dynamic attribute, and so on.

In the present example, the first dynamic table for the dynamic attribute account monthly rating includes (1) instance of a good rating, (2) instances of an OK rating, and (2) instances of a bad rating. These values are represented in the first column of the non-numeric dynamic report table. The second table for the dynamic attribute account monthly rating indicates that there is (1) instance of a good rating, (2) instances of an OK rating, and (2) instances of a bad rating. These values are represented in the second column of the non-numeric dynamic report table. This methodology is applied to each additional dynamic table in the set of tables for the account monthly rating attribute and a new column is generated in the numeric dynamic report table for each additional table.

Certain modifications and improvements will occur to those skilled in the art upon a reading of the foregoing description. By way of example, the user may input attribute values for an infinite number of instances of a particular entity. Further, an entity having only one attribute may be represented by only one type of table. It should be understood that the present invention may be employed for any type of context, and is not limited to the leasing company example discussed herein. In addition, the reports generated on selected attributes are not limited to the table format discussed herein. Rather, the report information may be manipulated into other formats, such as graphs. All such modifications and improvements of the present invention have been deleted herein for the sake of conciseness and readability but are properly within the scope of the following claims.

What is claimed is:

1. A computer readable media comprising software to instruct a computer to create:

a static table including a static attribute for values configured to remain constant;

a semi-dynamic table including a semi-dynamic attribute for values recorded on a non-periodic basis; and for each period at a first record frequency, a separate dynamic table including a first dynamic attribute for values recorded for each said period.

2. The computer readable media of claim 1 wherein the software is configured to further instruct a computer to include at least one additional dynamic attribute in said dynamic tables for values recorded for each said period at said first record frequency.

3. The computer readable media of claim 1 wherein the software is configured to further instruct a computer to create for each period at a second record frequency, a separate dynamic table including a second dynamic attribute for values recorded for each said period.

4. The computer readable media of claim 3 wherein the software is configured to further instruct a computer to include at least one additional dynamic attribute in said dynamic tables created for each period at said first record frequency for values recorded for each said period at said first record frequency.

5. The computer readable media of claim 1 wherein the software is configured to further instruct a computer to include a common identifying attribute in each of said static table, said semi-dynamic table, and said dynamic tables.

6. The computer readable media of claim 5 wherein the software is configured to further instruct a computer to determine a number of unique values for a given attribute.

7. The computer readable media of claim 6 wherein the software is configured to further instruct a computer to equate said given attribute with said identifying attribute in said static table.

8. The computer readable media of claim 6 wherein the software is configured to further instruct a computer to create a report on said given attribute, said report including said number of unique values for said given attribute.

9. The computer readable media of claim 1 wherein the software is configured to further instruct a computer to create a plurality of entities wherein each said entity includes an associated set of a static table, a semi-dynamic table, and dynamic tables.

10. The computer readable media of claim 9 wherein the software is configured to further instruct a computer to include:

a first identifying attribute in a first of said plurality of entities; and said first identifying attribute and a second identifying attribute in a second of said plurality of entities to establish a relationship between said first entity and said second entity.

11. The computer readable media of claim 1 wherein the software is configured to further instruct a computer to determine for each unique value for a given attribute, a number of occurrences of said unique value for said given attribute.

12. The computer readable media of claim 11 wherein the software is configured to further instruct a computer to equate said given attribute with an attribute chosen from the group consisting of said static attribute in said static table, said semi-dynamic attribute in said semi-dynamic table, and said first dynamic attribute in said dynamic tables.

13. The computer readable media of claim 11 wherein the software is configured to further instruct a computer to create a report on said given attribute, said report including said number of occurrences of each said unique value for said given attribute.

14. The computer readable media of claim 1 wherein the software is configured to further instruct a computer to determine for a given attribute having numeric values, a sum of said numeric values having like polarity.

15. The computer readable media of claim 14 wherein the software is configured to further instruct a computer to equate said given attribute with said first dynamic attribute in said dynamic tables.

16. The computer readable media of claim 14 wherein the software is configured to further instruct a computer to create a report on said given attribute, said report including said sum of said numeric values having like polarity for said given attribute.

17. The computer readable media of claim 1 wherein the software is configured to further instruct a computer to determine for a given attribute having numeric values, a number of occurrences of said numeric values having like polarity.

18. The computer readable media of claim 17 wherein the software is configured to further instruct a computer to equate said given attribute with said first dynamic attribute in said dynamic tables.

19. The computer readable media of claim 17 wherein the software is configured to further instruct a computer to create a report on said dynamic attribute, said report including said number of occurrences of said numeric values having like polarity for said given attribute.

20. The computer readable media of claim 1 wherein the software is configured to further instruct a computer to include a record attribute in said semi-dynamic table for values representing when a corresponding value for said semi-dynamic attribute is recorded.

21. The computer readable media of claim 20 wherein the software is configured to further instruct a computer to equate the values for said record attribute with one of the group consisting of a date and a time.

22. The computer readable media of claim 20 wherein the software is configured to further instruct a computer to create a semi-dynamic history table including a history of values for said semi-dynamic attribute and a history of values for said corresponding record attribute.

23. The computer readable media of claim 22 wherein the software is configured to further instruct a computer to include an identifying attribute in said semi-dynamic history table.

24. The computer readable media of claim 23 wherein the software is configured to further instruct a computer to determine for each possible value for a given attribute, a number of unique values for said identifying attribute associated with each of said possible values for said given attribute.

25. The computer readable media of claim 24 wherein the software is configured to further instruct a computer to equate said given attribute with said semi-dynamic attribute in said semi-dynamic history table.

26. The computer readable media of claim 24 wherein the software is configured to further instruct a computer to create a report on said given attribute, said report including said number of unique values for said identifying attribute associated with each of said possible values for said given attribute.

27. The computer readable media of claim 23 wherein the software is configured to further instruct a computer to determine for each possible value for a given attribute, a number of unique values for said identifying attribute associated with each of said possible values for the given attribute that occur a unique number of times for each said possible value for said given attribute.

28. The computer readable media of claim 27 wherein the software is configured to further instruct a computer to equate said given attribute with said semi-dynamic attribute in said semi-dynamic history table.

29. The computer readable media of claim 27 wherein the software is configured to further instruct a computer to create a report on said given attribute, said report including said number of unique values for said identifying attribute associated with each of said possible values for said semi-dynamic attribute that occur a unique number of times for each said possible value for said given attribute.

30. A method of creating a database comprising the steps of:
   creating a static table including a static attribute for values configured to remain constant;
   creating a semi-dynamic table including a semi-dynamic attribute for values recorded on a non-periodic basis; and
   creating, for each period at a first record frequency, a separate dynamic table including a first dynamic attribute for values recorded for each said period.

31. The method of claim 30 further comprising the step of creating for each period at a second record frequency, a separate dynamic table including a second dynamic attribute for values recorded for each said period.

32. The method of claim 30 further comprising the step of including a common identifying attribute in each of said static table, said semi-dynamic table, and said dynamic tables.

33. The method of claim 30 further comprising the step of including in said semi-dynamic table a record attribute for values representing when a corresponding value for said semi-dynamic attribute is recorded.

34. The method of claim 33 further comprising the step of creating a semi-dynamic history table including a history of values for said semi-dynamic attribute and a history of values for said corresponding record attribute.

35. A database structure comprising:
   a static table including a static attribute for values configured to remain constant;
   a semi-dynamic table including a semi-dynamic attribute for values recorded on a non-periodic basis; and
   for each period at a first record frequency, a separate dynamic table including a first dynamic attribute for values recorded for each said period.

36. The database structure of claim 35 further comprising for each period at a second record frequency, a separate dynamic table including a second dynamic attribute for values recorded for each said period.

37. The database structure of claim 35 wherein each of said static table, said semi-dynamic table, and said dynamic tables includes a common identifying attribute.

38. The database structure of claim 35 wherein said semi-dynamic table further includes a record attribute for values representing when a corresponding value for said semi-dynamic attribute is recorded.

39. The database structure of claim 38 further comprising a semi-dynamic history table including a history of values for said semi-dynamic attribute and a history of values for said corresponding record attribute.

40. A system for creating a database structure comprising:
   a computer having a central processing unit; and
   software for instructing said computer to create:
      a static table including a static attribute for values configured to remain constant;
      a semi-dynamic table including a semi-dynamic attribute for values recorded on a non-periodic basis; and
      for each period at a first record frequency, a separate dynamic table including a first dynamic attribute for values recorded for each said period.

* * * * *